United States Patent [19]

Carter

[11] Patent Number: 5,049,082

[45] Date of Patent: Sep. 17, 1991

[54] THRU WIRE HELM ASSEMBLY

[75] Inventor: Thomas G. Carter, Kent, Ohio

[73] Assignee: IMO Industries, Inc., Hudson, Ohio

[21] Appl. No.: 494,164

[22] Filed: Mar. 15, 1990

[51] Int. Cl.⁵ .......................................... H01R 39/00
[52] U.S. Cl. ....................................... 439/15; 439/34
[58] Field of Search ................... 439/4, 11, 13, 15, 16, 439/34, 501, 492

[56] References Cited

U.S. PATENT DOCUMENTS 4,744,763  5/1988  Suzuki et al. ........................ 439/15
4,844,359  7/1989  Kato .................................... 439/15

Primary Examiner—Larry I. Schwartz
Assistant Examiner—Julie R. Daulton
Attorney, Agent, or Firm—Hopgood, Calimafde, Kalil, Blaustein & Judlowe

[57] ABSTRACT

The present invention provides a wire helm in which a coil of electric wire within the bezel of the helm is contained by a wire coil retainer and a backer plate. The backer plate is mounted on the wheel shaft and rotates therewith, whereas the retainer is mounted in fixed relation to the dashboard. One end of the wire coil is connected to the dash through a hole or slot in the retainer, while the other end of the wire runs along a slot in the shaft to connections of the wheel. As the wheel turns in one direction, the wire coil tightens, whereas when the wheel turns in the opposite direction, the coil partially unwinds. In another aspect of the invention, there is provided a bezel which itself contains the wire coil. A bezel-mounted bottom backer plate serves as a barrier to keep the coil within the bezel. A first end of the wire runs along the shaft to the wheel, and a second end is connected to the dash through an opening in the plate. A collar holds the first end securely against the shaft and facilitates the winding and unwinding of the wire.

4 Claims, 4 Drawing Sheets

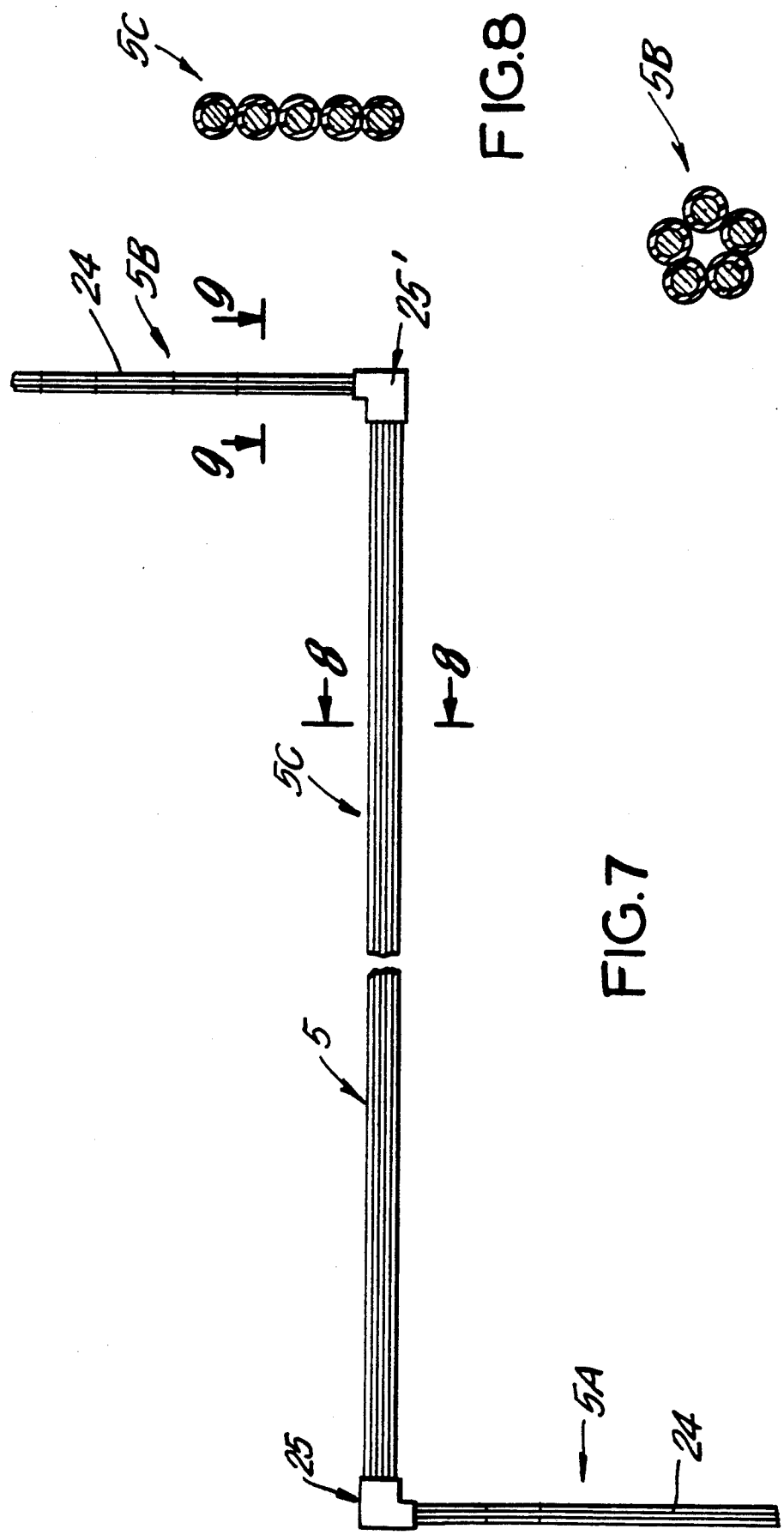

THRU WIRE HELM ASSEMBLY

BACKGROUND OF THE INVENTION

This invention relates to the field of electrical wiring systems for connecting rotating elements, and particularly to a wiring system for making an electrical connection between a stationary power source and a steering wheel mounted electric element on a marine helm.

Modern marine helms typically include electric switches and other elements connected to a power source located behind the dashboard. In the traditional arrangement, all the electric elements would be located on the dash and would be hard-wired to the power source, and the wheel of the vessel would not be wired.

It is often desirable to have the electric switches located on the wheel itself. One important advantage of this arrangement is convenience; the helmsman may steer while simultaneously manipulating the switches without reaching for the dashboard.

Problems arise, however, when one attempts to hardwire an element on a wheel, which must be free to rotate, to a non-rotating power source. Existing marine helms typically rotate about four full turns lock to lock. To hardwire an element on the wheel to the dashboard, one would need a large excess of wiring so that the wheel's rotation would not be restricted. As the wheel rotates, such excess wire would wind and unwind about the wheel shaft, causing excessive stress on the wiring and eventual wiring failure.

SUMMARY OF THE INVENTION

In one aspect, the present invention provides a wire helm in which a coil of electric wire, located inside the helm's bezel, is contained between a wire coil retainer and a backer plate. The backer plate is mounted on the wheel shaft and rotates therewith, whereas the retainer is mounted in fixed relation to the dashboard. One end of the wire coil is connected to the dash through a hole or slot in the retainer while the other end of the wire runs along a slot in the shaft to connections on the wheel. As the wheel turns in one direction, the wire coil tightens, whereas when the wheel turns in the opposite direction, the coil unwinds.

In another aspect of the invention, there is provided a bezel which itself contains the wire coil. A bezel-mounted bottom backer plate serves as a barrier to keep the coil within the bezel. A first end of the wire runs along the shaft to the wheel, and a second end is connected to the dash through an opening in the plate. A collar holds the first end securely against the shaft and facilitates the winding and unwinding of the wire.

One object of the present invention is to provide a functional helm having the steering wheel wired to the dash.

Another object of the invention is to provide an assembly in which a coiled wire may be wound and unwound in a consistent and reliable manner without undue stress.

It is also an object of the invention to provide a system that accommodates wires which are stationary at one end and rotating at the other end.

A further object of the present invention is to provide a thru wire helm assembly that fits into existing helms.

BRIEF DESCRIPTION OF THE DRAWINGS

FIG. 7 shows a wire assembly having a flat wire and two wire clips that allow the wire ends to transform into round wire.

FIG. 8 is a cross-sectional view of a section of the flat wire of FIG. 7 seen along line 8—8.

FIG. 9 is a cross-sectional view of a section of the round wire of FIG. 7 viewed along line 9—9.

DETAILED DESCRIPTION OF THE PREFERRED EMBODIMENTS

Figure 1:
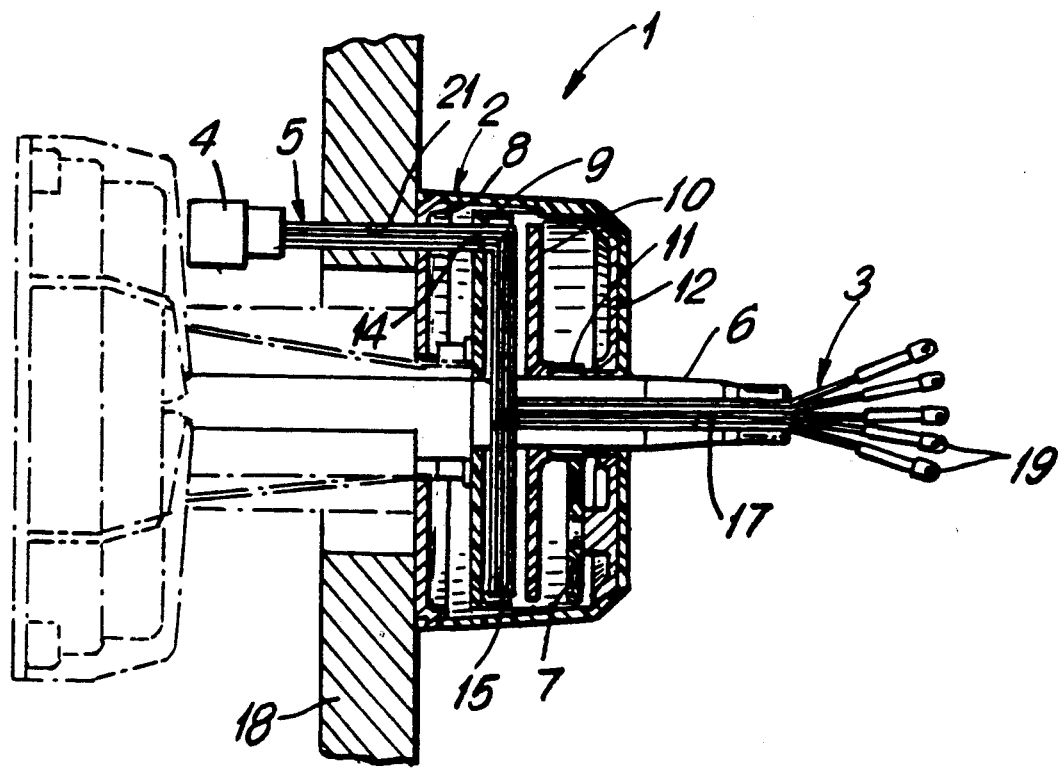
FIG. 1 is a top cross-sectional view of a helm assembly according to the present invention.
Figure 2:
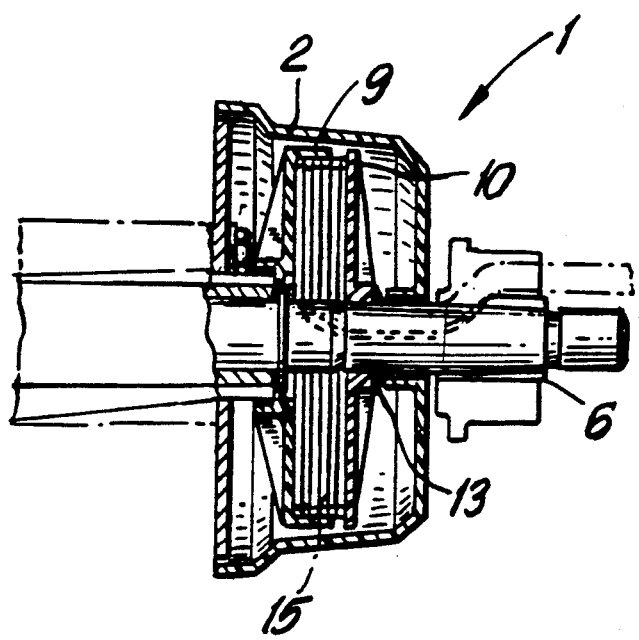
FIG. 2 is a cross-sectional side elevation of the assembly shown in FIG. 1.

A preferred embodiment of the thru wire helm assembly according to the present invention is illustrated in FIGS. 1-2. The helm assembly 1 includes flat ribbon wire 5, one end of which is connected to a power source 4 located behind the dashboard 18. The wire 5 passes through an opening 21 in the dashboard 18 and through a hole 14 in a wire coil retainer 9 and forms a coil 15 within the bezel 2. The other end of the wire 5 runs along a slot 17 in the wheel shaft 6, terminating in a wire harness 3 connected to rotating switches 19.

The coil 15 is held in place by the retainer 9 and by a backer plate 10. This prevents the wire coil 15 from unraveling. The backer plate 10 rotates with the shaft 6; a star washer 13 is mounted on the shaft 6 against the backer plate lo. The retainer 9 is stationary with respect to the dash 18.

The helm shown in FIGS. 1-2 includes a mounting bracket 8 to join the bezel 2 to the dash 18. An idler gear 7 and a pinion gear 11 facilitate rotation of the shaft 6. An indicator disk 12 on the bezel 2 provides a rotational reference point so that the helmsman will be able to determine the position of the wheel.

As the wheel shaft 6 rotates in one direction, the coil 15 winds more tightly about the shaft 6, whereas when the shaft 6 rotates in the opposite direction the coil 15 unwinds.

The wire assembly 1 of FIGS. 1-2 described above is designed to fit inside existing bezels.

Figure 3:
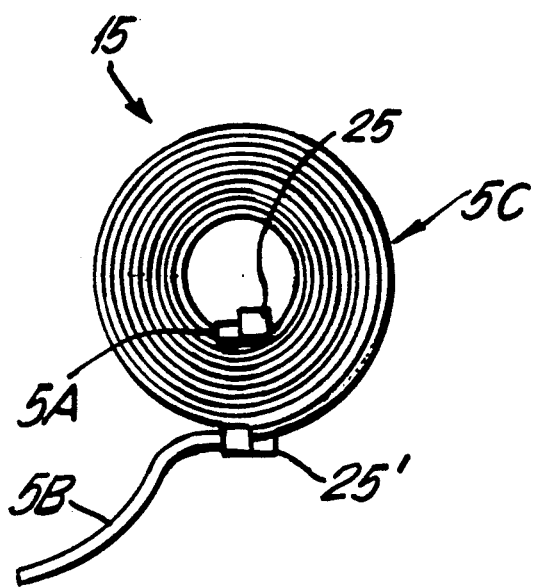
FIG. 3 is a front elevation of a wire coil and wire clips according to the present invention.

FIG. 3 illustrates a preferred variation of the wire assembly in which the wire coil 15 comprises a continuous strand of flat wire 5 in which wire clips 25 facilitate the bending of the wire 5 at approximately 90 angles, and facilitate the transformation of the ends into round wire 24. In this variation, one end of round wire 24 runs along the wheel shaft 6 while the other end passes through the dashboard 18 and connects to the power source 4.

Figure 4A:
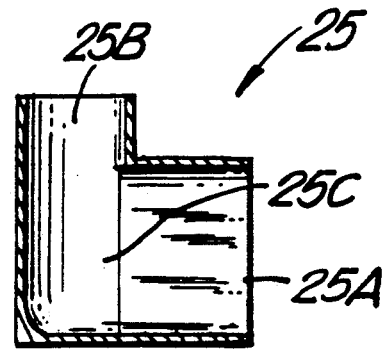
FIG. 4A is a top plan view of a wire clip shown in FIG. 3.
Figure 4B:
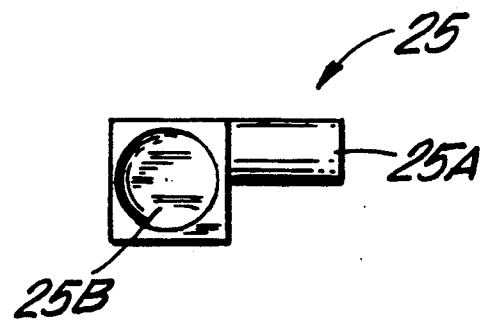
FIG. 4B is a front elevation of the wire clip shown in FIG. 4A.
Figure 4C:
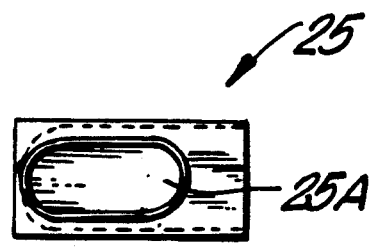
FIG. 4C is a side elevation of the wire clip shown in FIG. 4A.

FIGS. 4A through 4C illustrate the preferred wire clips 25 for transforming the ends of the flat wire 5 into round wire 24.

In FIG. 4A, an elevated cross-sectional view of a wire harness clip 25 of the present invention is shown. As illustrated, wire harness clip 25 has an input port 25A, an output port 25B, and a wire passageway 25C formed therebetween. As shown, input port 25A is disposed substantially orthogonal with respect to output port 25B. As illustrated in greater detail in FIGS. 4B and 4C, output port 25B has a substantially cylindrical geometry, whereas input port 25A has a substantially rectangular geometry.

Figure 5A:
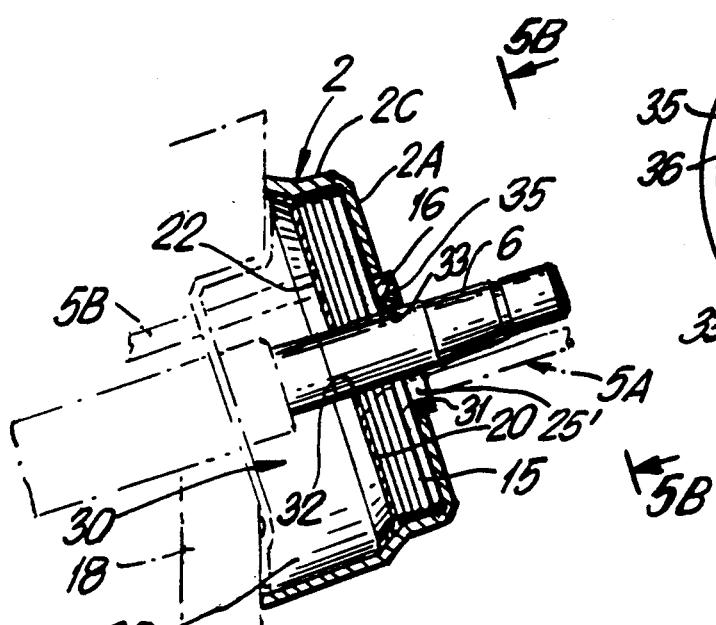
FIGS. 5A and 5B are a combination of a cross-sectional side elevation and a front elevation of another embodiment of a helm assembly according to the present invention.
Figure 5B:
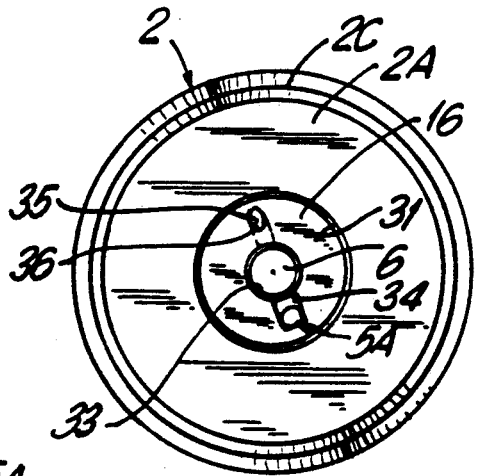
Figure 6A:
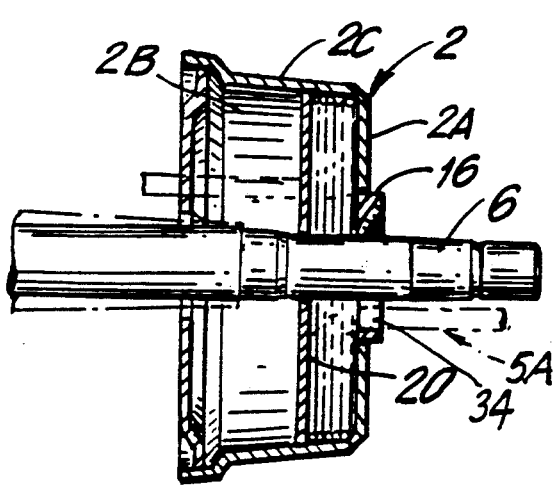
FIGS. 6A and 6B are a combination of a top and a front cross-sectional elevation of the assembly shown in FIG. 5.
Figure 6B:
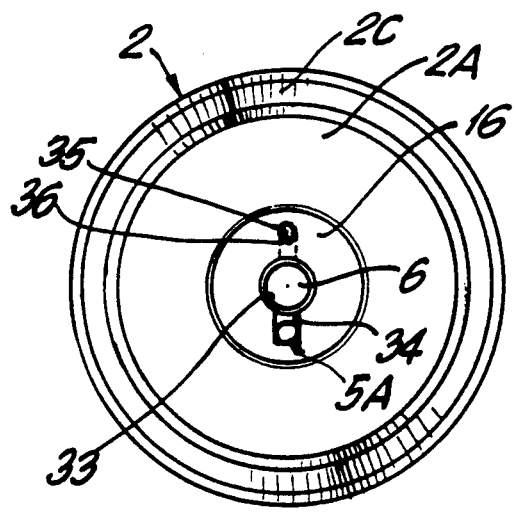

Another embodiment of the helm bezel assembly of the present invention is illustrated in FIGS. 5–6. In this embodiment, helm bezel assembly comprises a helm bezel housing 2, a wire coil 15, a bezel plate (i.e. bottom backer plate) 20, and a collar 16. As shown, bezel housing 2 has a first housing end 2A and a second housing end 2B, with continuous side wall surfaces 2C extending therebetween which together define an interior cavity 30 between first and second housing ends 2A and 2B, respectively. As illustrated in FIGS. 5A and 5B, first housing end 2A has a first axially disposed aperture 31, through which steering wheel shaft 6 is free to pass. Also as shown, second housing end 2B is substantially open and is adapted for stationary mounting to dashboard 18. Wire coil 15 is wound in an annular configuration and has a first end portion 15A and a second end portion 15B. Bezel plate 20 has a second axially disposed aperture 32 and circular circumferential dimensions which permit positioning of bezel plate 20 stationarily within interior cavity 30 of bezel housing 2. In this way, wire coil 15 is confined between first housing end 2A and bezel plate 20, as shown is FIG. 5A, while second end portion 5B of wire coil 15 is permitted to extend through third aperture 22 formed in bezel plate 20 and be connected to or through dashboard. As further illustrated in FIGS. 5A and 5B, collar 16 is annular shaped and has a centrally disposed bore 33 through which steering shaft 6 is permitted to pass. As shown, collar 16 includes an aperture 34 adjacent bore 33 for permitting second end portion 5B of wire coil 5 to pass through collar 16, up along steering shaft 6, to a steering wheel (not shown). Collar 16 also includes a screw 35 threaded through an oblique bore 36, which securely engages with steering wheel shaft 6 to stationarily mount collar 16 to same, while collar 16 is permitted to rotate freely within axially disposed aperture 31 formed in first housing end 2A. As shown in FIG. 5A, wire harness clip 15 is provided over first end portion 15A of wire coil 15 to secure the same to collar 16; the wire coil 15 is held by the bezel 2 instead of by a retainer. A bezel plate 20 is keyed to the bezel housing 2 to keep the coil 15 from unravelling. Since second end portion 5B of wire 5 is held adjacent shaft 6 by collar 16 to facilitate the coiling action; the collar 16 makes it unnecessary to provide a slot in the shaft 6. This helm bezel assembly comprises a single unit that is adapted for installation about a steering wheel shaft, and as such; has the ability to replace existing wireless helms without modification to existing parts.

The wire helms of this invention include an excess of wire so that stress due to winding and unwinding is kept to a minimum. The elements containing the coil prevent unraveling so that the wire will not get tangled or twisted in operation. Thus, the wire is expected to have a long service life. The use of wire clips further extends the service life by reducing wear on the wires during rotations.

The flat multiconductor wire provides an electrical connection for more than one switch, or other electric element, on the wheel. This wire also resists twisting, and is the preferred electrical conduit for the wire coil of this invention. Most preferably, the flat wire is a continuous strand of multiconductor wire. FIGS. 7–9 illustrate a wire assembly in which flat multiconductor wire 5 is bent, via wire clips 25.

As shown in FIG. 7, in particular, wire harness assembly 5 comprises a length of multiconductor wire having first end portion 5A, second end portion 5B and a third flat portion 5C disposed between first and second end portions 5A, 5B. As shown in FIGS. 1, 2, 3 and 5A and discussed above, third flat wire portion 5C is configurable into an annular coil. As illustrated in FIG. 7, a pair of wire harness clips 25 and 25' are applied to wire harness 5 between first end portion 5A and third flat portion 5C and second end portion 5B and third flat portion 5C, respectively. As discussed above, first wire harness clip 25 permits the length of multiconductor wire to be passed through its wire passageway 25C so that first wire harness clip 25 is disposed between first end portion 5A and flat third portion 5C. Similarly, second wire harness clip 25' permits the length of multiconductor wire to be passed through its wire passageway 25C' so that second wire harness clip 25' is disposed between second end portion 5B and third flat portion 4C, as shown. Using wire harness clips 25, 25', first and second end portions 5A, 5B are directed orthogonally from flat third wire portions 5C, and have a substantially cylindrical configuration when exiting respective harness clips, as shown in FIG. 9. As shown in FIG. 8, flat third wire portion 5C has a planar cross-section in order to facilitate configuration into an annular shaped coil, as shown in FIG. 3; while five conductor wire has been shown in the illustrated embodiment, the invention is not, however, limited to an assembly containing such wire; it is contemplated that one may use any wire which suits the electrical needs of the user and has the flexibility and strength to withstand winding and unwinding around the wheel shaft.

The power source is typically a 12-volt battery which provides direct current to the vessel's electric elements, although other power sources may be used in the practice of the present invention.

The non-wire elements of this invention may be constructed from any mechanically suitable material such as steel, aluminum, other metals or metal alloys, high-strength plastics, and the like. The wire is typically insulted copper wire, although any suitable conductor may be used.

Although the above examples illustrate a wire assembly in which rotating switches are connected to a power source behind the dash, it will be understood that the invention is suitable to connect any electric element on the wheel, e.g., a gauge, to any other non-rotating electric element which may be accessed through the dashboard of the vessel.

While specific embodiments of the invention have been described herein for the purposes of illustration, it will be understood that there are many modifications that will occur to those skilled in the art. This invention is not limited to the specific embodiments shown and described, but includes all of the subject matter within the scope of the accompanying claims.

I claim:

1. A helm bezel assembly adapted for installation about a steering wheel shaft which extends through a dashboard of a vessel and is capable of supporting a steering wheel, said electric bezel assembly comprising:
   - a bezel housing having a first housing end and a second housing end, with continuous side wall surfaces extending therebetween, which define an interior cavity between said first and second housing ends, said first housing end having a fist axially disposed aperture through which said steering wheel shaft is free to pass, and said second housing end being substantially open and adapted for stationary mounting to said dashboard;
   - a wire coil wound in an annular configuration and having a first end portion and a second end portion;
   - a bezel plate having a second axially disposed aperture and circumferential dimensions permitting positioning of said bezel plate stationarily within said interior cavity of said bezel housing so as to confine said wire coil between said first housing end and said bezel plate, while said second end portion of said wire coil is permitted to extend through a third aperture formed in said bezel plate and be connected to said dashboard; and
   - a collar adapted for stationary mounting to said steering wheel shaft and for securing said second end portion of said wire coil adjacent said steering wheel shaft and permitting said second end portion to extend up said steering wheel shaft to said steering wheel, said collar being further adapted to rotate freely within said first axially disposed aperture in said first housing end, whereby said helm bezel assembly is capable of providing electrical connections between said steering wheel and said dashboard as said steering wheel shaft is rotated.

2. The helm bezel assembly of claim 1, wherein said wire coil comprises a length of multiconductor wire having said first end portion, said second end portion and a third flat portion disposed between said first and second end portions, said third flat portion being configurable into said annular configuration;
   - a first wire harness clip having a first input port, a first output port and a first wire passageway extending therebetween, said first wire harness clip permitting said length of multiconductor wire to be passed through said first wire passageway so that said first wire harness clip is disposed between said first end portion and said third flat portion; and
   - a second wire clip having a second input port, a second output port and a second wire passageway extending therebetween, said second wire harness clip permitting said length of multiconductor wire to be passed through said second wire passageway so that said second wire harness clip is disposed between said second end portion and said third flat portion.

3. The helm bezel assembly of claim 1, wherein said wire coil comprises flat multiconductor wire.

4. The helm bezel assembly of claim 3, wherein said collar has a fourth aperture for permitting said second end portion to pass through said collar and up along said steering wheel shaft, to said steering wheel.

* * * * *